(12) United States Patent
King et al.

(10) Patent No.: US 6,366,390 B1
(45) Date of Patent: Apr. 2, 2002

(54) PULSE INTERLEAVER

(75) Inventors: Jonathan King, Epping; Joanne Wakefield, Ware, both of (GB)

(73) Assignee: Nortel Networks Corporation, St. Laurent (CA)

( * ) Notice: Subject to any disclaimer, the term of this patent is extended or adjusted under 35 U.S.C. 154(b) by 0 days.

(21) Appl. No.: 09/459,547

(22) Filed: Dec. 13, 1999

(51) Int. Cl.$^7$ .............................. G02F 1/03; H04B 10/04
(52) U.S. Cl. ................. 359/264; 359/237; 359/281; 359/484; 359/181; 359/139; 359/182; 385/11; 385/24; 385/27; 385/31
(58) Field of Search ................. 359/264, 237, 359/281, 256, 246, 324, 583, 181, 484, 495, 497, 139, 173, 182; 385/11, 18, 24, 31, 32, 42, 45, 27

(56) References Cited

U.S. PATENT DOCUMENTS

| | | | |
|---|---|---|---|
| 5,111,323 A | * 5/1992 | Tanaka et al. ............... 359/139 |
| 5,400,418 A | * 3/1995 | Pearson et al. ............... 385/11 |
| 5,654,818 A | * 8/1997 | Yao .............................. 359/246 |
| 6,005,702 A | * 12/1999 | Suzuki et al. ................ 359/182 |
| 6,219,172 B1 | * 4/2001 | Yariv ............................ 359/264 |

* cited by examiner

*Primary Examiner*—Loha Ben
(74) *Attorney, Agent, or Firm*—Lee, Mann, Smith, McWilliams, Sweeney & Ohlson

(57) ABSTRACT

A pulse interleaver splits an input pulse train into at least two optical branches (20,22). A first one of the branches (20) carries a first signal, and is terminated with a mirror (24) and a device (26) for manipulating the state of polarization. The reflected signal is re-combined at a combiner (18) with a second signal on a second one of the branches (22). The effective path lengths for the first and second signals between the input and the combiner are selected such that the input pulse train is interleaved with itself thereby providing an output with increased frequency. The mirror (24) and the device for manipulating the state of polarization (26) provide a predetermined relationship between the polarization of pulses in the output pulse train derived from an individual pulse of the input pulse train.

16 Claims, 2 Drawing Sheets

PULSE INTERLEAVER

FIELD OF THE INVENTION

This invention relates to a pulse interleaver for return-to-zero optical pulses. In particular, it relates to a pulse interleaver for interleaving an input pulse train with itself, thereby providing an output with increased frequency. The invention also is concerned with variations in the state of polarization which can occur during the transmission of optical pulse trains through optical fibres.

BACKGROUND OF THE INVENTION

Changes in polarization can adversely affect the performance of many different types of system. For example, polarization-induced signal fading is a recognised problem within optical communication systems. Polarization mode dispersion (PMD) also gives rise to polarization-dependent losses (PDL), and results from the birefringence of conventional optical fibres.

The conventional way to overcome polarization-induced signal fading is to use polarization maintaining fibres. However, these are costly and often difficult to incorporate effectively.

The use of Faraday rotator mirrors has been proposed as a replacement for reflectors at the ends of optical fibre arms in interferometer devices. A Faraday rotator mirror rotates a signal's state of polarization by 45 degrees twice—once when the light enters, and once again when the light is reflected back into the fibre. Since the Faraday effect is non-reciprocal, the resultant state of polarization is rotated by 90 degrees with respect to the original signal. These rotations, applied in combination with a reversal of the polarization handedness upon reflection at the mirror, yields a state of polarization that is perpendicular to the original signal. It is thus possible to ensure that any state of polarization fluctuations that occur along the fibre anywhere between the source and the Faraday rotator mirror are exactly compensated and their unwanted effects neutralised. For example, Faraday rotator mirrors have been proposed to replace the conventional mirrors in a Michelson interferometer.

SUMMARY OF THE INVENTION

According to the present invention there is provided a pulse interleaver comprising:
  an input for receiving a return-to-zero pulse train;
  a beam splitter for dividing the input pulse train into at least two optical branches, a first one of the branches carrying a first signal, and the first one of the branches being terminated with a mirror and a device for manipulating the state of polarization, the reflected signal being re-combined at a combiner with a second signal on a second one of the branches,
  wherein the effective path lengths for the first and second signals between the input and the combiner are selected such that the input pulse train is interleaved with itself thereby providing an output with increased frequency, and wherein the mirror and the device for non-reciprocal 45 degree rotation of the state of polarization provide a predetermined relationship between the polarization of pulses in the output pulse train derived from an individual pulse of the input pulse train.

The interleaver of the invention provides two path lengths for an input optical pulse train so that the pulse train is interleaved with itself thereby increasing the frequency.

Such a device enables a pulse train to be generated using electro-optic circuitry with a first pulse frequency, and to increase the frequency purely in the optical domain. This places less demand on the frequency characteristics of the electro-optic circuitry.

In its simplest form, the invention enables the frequency of a pulse train to be doubled, by using a beam splitter which divides the input pulse train into exactly two optical branches for subsequent recombination. However, it is equally possible to divide the input pulse train into more than two branches to enable a greater increase in frequency.

The use of a device for manipulating the state of polarization enables compensation of any polarization mode dispersion in the optical paths within the interleaver. Thus, differential polarization mode dispersion does not affect interleaving of the pulses. The mirror and the device may together comprise a Faraday rotator mirror. Alternatively the device may comprise a 45 degree aligned quarter wave plate, where the PMD axes are defined or known, for example in the case of a planar waveguide implantation of the invention where PMD is caused by the asymmetry of the waveguide properties.

Preferably, the second one of the branches is also terminated with a mirror and a device for manipulating the state of polarization, and wherein the beam splitter and the combiner are implemented as a single optical coupler, the reflected signals from the first and second branches each returning to the optical coupler.

This arrangement effectively defines a similar configuration to a Michelson interferometer, although the path lengths between the optical coupler and the two mirrors are selected to interleave pulses, rather than analyse the superposition of those pulses. A phase control element may be provided in one branch, and an amplitude control element may be provided in the other branch to control the interleaving function. These two units may instead be provided in one of the branches. Furthermore, a modulator may be provided in each of the branches between the optical coupler and the respective mirror. This may enable an optical time division multiplexing system to be implemented.

Preferably, the predetermined relationship between the polarization of pulses may be that they have the same polarization. In this way, the output of the device is polarization-independent, so that all pulses derived from an individual pulse of the input pulse train have the same polarization as that input pulse train. The use of a polarization-independent interleaver makes the interleaver more suitable for use in certain systems, such as very high speed optical transmission systems.

An alternative configuration to the Michelson-type configuration described above is for the beam splitter to comprise a 3 dB 2×2 coupler, the reflected signal from the first branch returning to the coupler and being at least partially transferred to a third branch, the signal on the third branch being re-combined with the second signal on the second one of the branches at the combiner, the combiner comprising a further coupler.

In this alternative arrangement, a single Faraday rotator mirror (or other arrangement) is used to provide the polarization control, although two separate couplers are then required, as opposed to the single coupler required in the Michelson-type arrangement.

In this case, an attenuator and a phase adjusting unit may be provided in the first branch between the 3 dB coupler and the mirror.

This arrangement enables the predetermined relationship between the polarization of pulses derived from an individual pulse of input train to be that they have orthogonal polarization. There are some applications where it is desirable to have adjacent pulses in the optical pulse train having orthogonal polarizations. For example when interleaving very high rate pulse streams, alternate orthogonally polarised pulses show lower pulse-pulse interaction because the adjacent pulse optical fields do not mix coherently.

An alternative design employs an optical circulator in the first one of the branches between the beam splitter and the mirror, the reflected signal being directed to a third branch by the circulator, the signal on the third branch being combined by the combiner with the second signal on the second one of the branches.

This further alternative design again enables alternate pulses to have orthogonal polarization. The use of a reflective spur (between the circulator and the mirror) enables orthogonal polarization of adjacent bits to be achieved more easily, and more stably.

The output pulses derived from an individual pulse of the input pulse train may be arranged to be adjacent each other. In such a case, the path difference is required to provide a differential delay of half the spacing between input pulses. Alternatively, the path lengths may be selected such that output pulses derived from an individual pulse of the input pulse train are spaced a predetermined number of pulses apart in the output pulse train, such that a signal sequence at the input is interleaved with itself with an interleaving depth dependent on the predetermined number.

This implementation enables a degree of randomness in the input pulse train to be preserved, by interleaving the pulse train with itself over a greater depth. This may be useful if the interleaver is used to increase the frequency of a test or quasi-random input signal.

BRIEF DESCRIPTION OF THE DRAWINGS

Preferred examples of the invention will now be described in detail with reference to the accompanying drawings in which.

DETAILED DESCRIPTION

Figure 1:
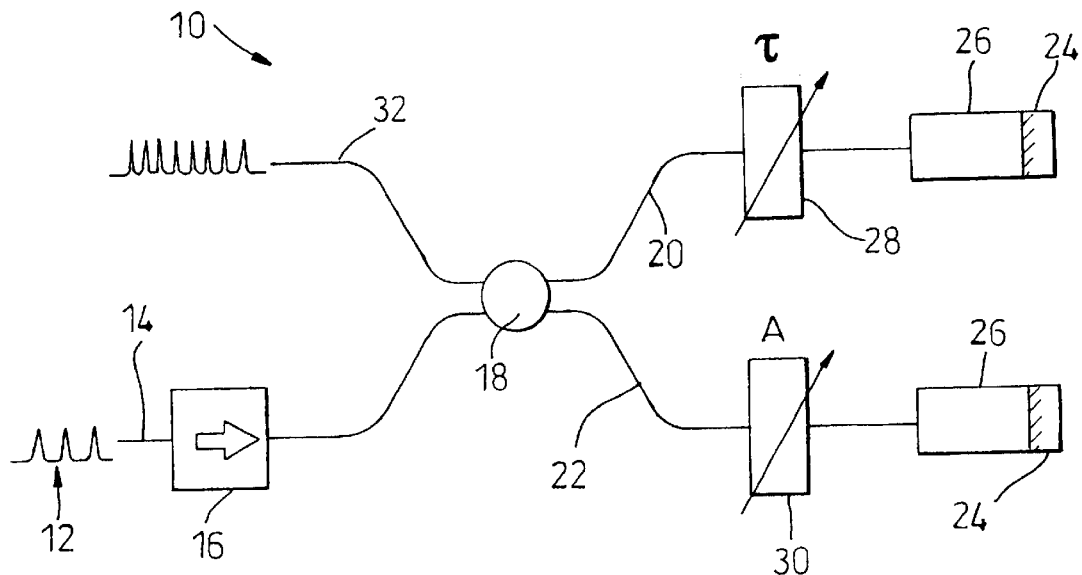
FIG. 1 shows a first pulse interleaver according to the invention.

FIG. 1 shows a pulse interleaver 10 according to the invention. A return-to-zero pulse train 12 is applied to the input 14 of the interleaver 10 where it passes through an isolator 16, which may also polarize the input pulse train. The signal is then supplied to a beam splitter 18 in the form of a 3 dB coupler which provides equal outputs to first and second branches 20, 22. Each branch is terminated with a mirror 24 and a device 26 for manipulating the state of polarization. This is provided to compensate for path birefringence.

The operation of the device for manipulating the state of polarization is such that the components of the polarization aligned with the path birefringence axes are swapped by the device. When the birefringence to be compensated is an unknown combination of linear birefringences (for example as in an optical fiber path), swapping the incoming polarization axes can be achieved by non-reciprocal 45 degree rotation of the state of polarization (so that the combined effect is 90 degree rotation), which is achieved with a Faraday rotator mirror. The elements 24, 26 together comprise a Faraday rotator mirror in the example of FIG. 1.

However, when the birefringence to compensated for is of known orientation linear birefringence (but unknown magnitude), swapping axes can be achieved either by rotating axes of polarization as described above, or by swapping the axes with a quarter wave plate aligned at 45 degrees to the principal axes of birefringence.

A phase control element 28 is provided in the first branch 20, in the form of an optical delay line. An attenuator 30 is provided in the second branch 22. The signals reflected by the two mirrors 24 are combined at the coupler 18 and a proportion of the re-combined signal is provided to output 32. The delay line and attenuator allow precise pulse-pulse interleaving times, and pulse-pulse height variation to be controlled.

The effective path lengths of the first and second branches 20, 22 are such that the input pulse train is interleaved with itself so that an output is provided with increased frequency. Furthermore, the Faraday rotator mirrors compensate for polarization mode dispersion resulting from the birefringence of the optical fibres between the 3 dB coupler 18 and the respective Faraday rotator mirrors.

Each input pulse gives rise to two pulses at the output 32, and the arrangement of FIG. 1 provides that the polarization of these two pulses is the same as the individual pulse entering the coupler 18 from which the two pulses are derived. In this example, the 3 dB coupler acts both as a beam splitter for the input signal as well as a combiner for the two reflected signals from the two branches 20,22. The use of Faraday rotator mirrors enables standard fibres, instead of polarization maintaining fibres, to be used within the pulse interleaver, whilst implementing a polarization-independent bit interleaver.

The input pulse train may for example comprise a 20 Gbps pulse train, and the output will then comprise a 40 Gbps pulse train. Two such interleavers may be used in series to provide an 80 Gbps pulse train, which may be used as the carrier in an optical communication system using modulation of a carrier signal. The interleaver may be used within optical processing and partial regeneration systems.

The polarization-independent interleaver of the invention avoids polarization drift between the differential paths of the interleaver and avoids the need to control the incoming polarization to the interleaver. The input polarization may vary randomly, but the interleaver will have the same effect on both branches, so that the output has co-polarized adjacent pulses.

The interleaver may be implemented using planar waveguide technology, in which particular problems of birefringence are encountered giving rise to increased polarization mode dispersion. When used to generate high speed optical clocks, there is no need to track or control the state of polarization between individual pulse interleavers within a series configuration.

The invention enables a passive optical CDMA system to be implemented as well as self-referenced coherent modulation formats (DPSK, DFSK) where incoming polarization alignment must be maintained to enable demodulation.

A CDMA system requires a code word to be produced in the form of a predetermined sequence of pulses. To achieve this, the splitter 18 may provide a number of outputs corresponding to the number of pulses in the code word. Each output then has a respective delay associated with it, so that the eventual output provides the code words for the CDMA system. In planar waveguide technology, in particular, multiple output couplers can be implemented and path lengths can be controlled very accurately. As described above, quarter wave plates can then provide the polarisation manipulation required to cancel the effects of waveguide PMD and PDL.

A system relying upon self-referenced coherent demodulation receives incoming data with differential phase shift keying (DPSK) or differential frequency shift keying (DFSK). A "1" is encoded as an optical phase/frequency change between bit periods, and a "0" is encoded as no change between bit periods. The demodulation process compares the optical signal between adjacent bit periods by coherently mixing them. This requires the optical signals to have the same polarization, and requires an optical circuit capable of delaying pulses relative to each other and combining these signals, whilst maintaining the state of polarization. The invention may be used in such a system, as it is not sensitive to input polarization or to PMD changes.

To implement a demodulator, the differential path length between the two branches is equal to half the bit period, so that adjacent bits are combined. With DPSK, a low output will result when the adjacent bits have equal phase (coherent addition), and a low output will result when they have opposite phase (coherent subtraction). A low output signal therefore represents a phase change between adjacent bits.

Figure 2:
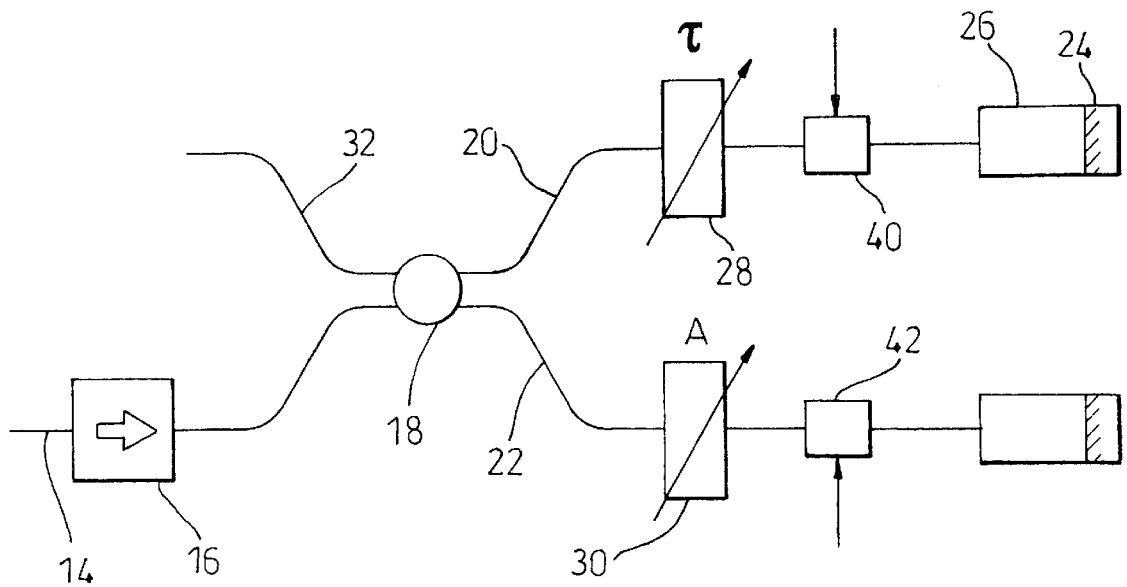
FIG. 2 shows a modification of the interleaver of FIG. 1 enabling signal modulation.

FIG. 2 shows a modification to the interleaver of FIG. 1 in which a first modulator 40 is provided between the delay line 28 and the mirror 24 of the first path 20, and a second modulator 42 is provided between the attenuator 30 and the mirror 24 in the second branch 20. These modulators enable encoding of data on to the output pulse train.

Figure 3:
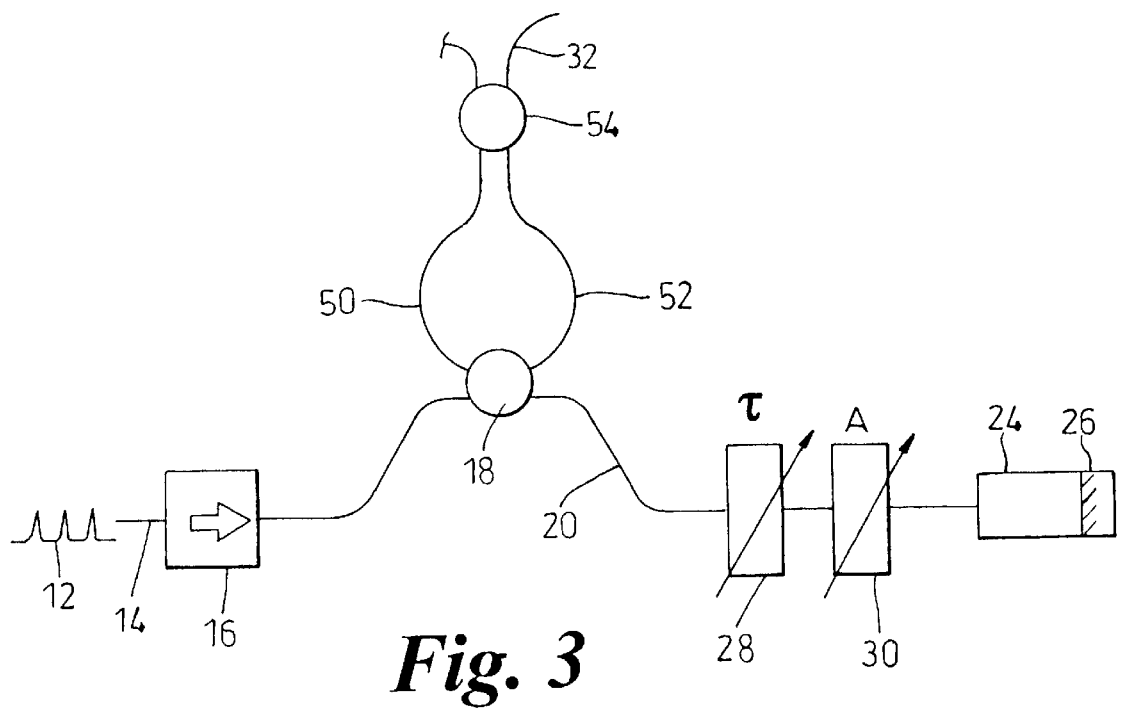
FIG. 3 shows a second design of interleaver according to the invention.

FIG. 3 shows an alternative design of pulse interleaver according to the invention. In this design the input pulse train 12 is again passed through an isolator 16 and into a 3 dB coupler 18. The first branch 20 again passes to a Faraday rotator mirror 24, 26, and there is an optical delay line 28 and an attenuator 30 provided in the path between the coupler 18 and the Faraday rotator mirror 24, 26. The reflected signal returns to the coupler 18, where half of the signal passes to a third branch 50. The other half of the signal passes back along the input 14 and is absorbed by the isolator 16. Half of the original input signal has passed to a second branch 52, and the signal on the second branch 52 is combined with the signal on the third branch 50 at a combiner 54, for example in the form of a 10 dB coupler.

In this design, the signals combined at the coupler 54 have a path difference resulting from the spur 20 (the first branch).

The inputs to the 10 dB coupler 54 contribute unequally to the output 56. With suitable control of the attenuator 30, the pulses of the interleaved output can be controlled to have substantially constant intensity.

To implement the interleaver design shown in FIG. 3, standard fibres may again be used, and the relative amplitude and phase of the two signals to be interleaved is adjusted by the attenuator 30 and the delay line 28. Again, the Faraday rotator mirror 24 compensates for any polarization mode dispersion along the spur 20. For certain inputs to the interleaver, the Faraday rotator mirror gives rise to orthogonal polarization states for the two signals transmitted between the coupler 18 and the combining coupler 54. Those inputs which achieve this orthogonal polarization lie on a great circle of the Poincarre sphere. Preferably, the optical paths between the 3 dB coupler 18 and the 10 dB coupler 54 have near zero birefringence, or else have a length equal to an integral number of beat lengths of the interferometer.

Figure 4:
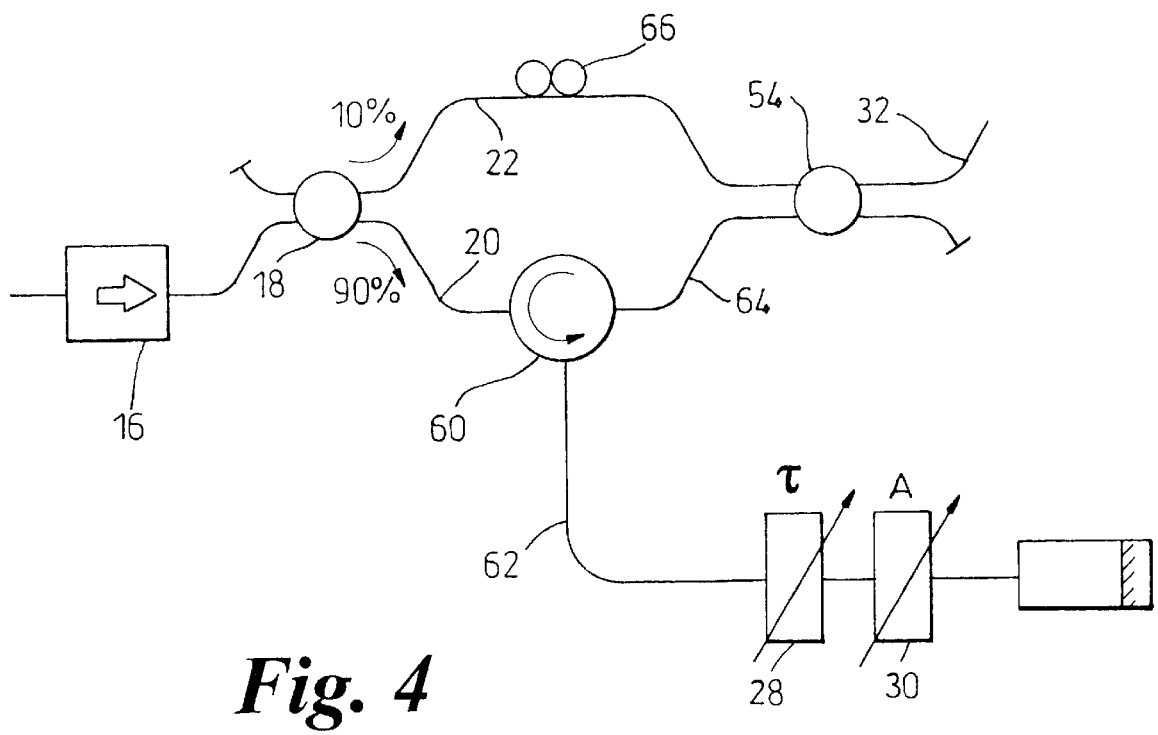
FIG. 4 shows a third design of interleaver according to the invention.

FIG. 4 shows a further example of pulse interleaver according to the invention, in which orthogonal polarization of adjacent bits in the output stream can be achieved, provided there is a linear polarization input.

This arrangement has similarities with a Mach-Zehnder interferometer design. The output from the isolator 16 is again provided to a coupler 18 for splitting the input signal into two branches, the first branch 20 and the second branch 22. The coupler comprises a 10 dB coupler, which provides approximately 90% of the input signal to the first branch 20 and 10% of the input signal to the second branch 22. An optical circulator 60 is provided in the first branch 20, which provides that signals received along the first branch 20 are routed to a spur 62 which is terminated with the Faraday rotator mirror 24, 26. Again, the spur 62 is provided with an attenuator 30 and a delay line 28. The returned reflected signal is then routed by the circulator 60 to a third branch 64, the signal on which is eventually coupled at the combiner 54, this time in the form of a 3 dB coupler. This combiner 54 combines a signal on the third branch 64 with the signal on the second branch 22. The second branch 22 may be provided with a polarization adjustment unit 66.

The spur 62 allows very long delay lengths to be achieved in a fiber based device, but with greatly reduced PMD and PDL and better relative polarization stability.

One of the outputs of the combiner 54 provides the output 32 of the pulse interleaver.

This arrangement can provide that alternate bits in the output stream are orthogonally polarized. Linear polarization is required at the input, and this is ensured by providing a polarizer function at the unit 16.

The length of the spur 62 determines the path difference between the two signals to be combined at the combiner 54. A path length is required to result in interspersion of one set of pulses with the other. However, the path length does not need to correspond to half the pulse spacing in the input signal, but may be much longer, for example 1,000.5 times the pulse spacing. This enables an input bit sequence at the input of the interleaver to be interleaved with itself over a significant depth, so that a degree of randomness of the input can be preserved.

What is claimed is:

1. A pulse interleaver comprising:
   an input for receiving a return-to-zero pulse train;
   a beam splitter for dividing the input pulse train into at least two optical branches, a first one of the branches carrying a first signal, and the first one of the branches being terminated with a mirror and a device for manipulating the state of polarization, the first signal reflected by the mirror being re-combined at a combiner with a second signal on a second one of the branches,
   wherein the effective path lengths for the first and second signals between the input and the combiner are selected such that the input pulse train is interleaved with itself thereby providing an output with increased frequency, and wherein the mirror and the device for non-reciprocal 45 degree rotation of the state of polarization provide a predetermined relationship between the polarization of pulses in the output pulse train derived from an individual pulse of the input pulse train.

2. A pulse interleaver as claimed in claim 1, wherein the second one of the branches is also terminated with a mirror and a device for manipulating the state of polarization, and wherein the beam splitter and the combiner are implemented as a single optical coupler, the reflected signals from the first and second branches each returning to the optical coupler.

3. A pulse interleaver as claimed in claim 2, wherein a phase control element is provided in the first one of the branches between the optical coupler and the respective mirror, and an amplitude control element is provided in the second one of the branches between the optical coupler and the respective mirror.

4. A pulse interleaver as claimed in claim 2, wherein the optical coupler comprises a 3 dB coupler.

5. A pulse interleaver as claimed in claim 2, further comprising a modulator in each of the first and second branches between the optical coupler and the respective mirror.

6. A pulse interleaver as claimed in claim 2, wherein the predetermined relationship between the polarization of pulses derived from an individual pulse of the input pulse train is that they have the same polarization.

7. A pulse interleaver as claimed in claim 1, wherein the beam splitter comprises a 3 dB 2×2 coupler, the reflected signal from the first branch returning to the coupler and being at least partially transferred to a third branch, the signal on the third branch being re-combined with the second signal on the second one of the branches at the combiner, the combiner comprising a further coupler.

8. A pulse interleaver as claimed in claim 7, wherein an attenuator and a phase adjusting unit are provided in the first one of the branches between the 3 dB coupler and the mirror.

9. A pulse interleaver as claimed in claim 8, wherein the predetermined relationship between the polarization of pulses derived from an individual pulse of the input pulse train is that they have orthogonal polarization.

10. A pulse interleaver as claimed in claim 1, wherein an optical circulator is provided in the first one of the branches between the beam splitter and the mirror, the reflected signal being directed to a third branch by the circulator, the signal on the third branch being combined by the combiner with the second signal on the second one of the branches.

11. A pulse interleaver as claimed in claim 10, wherein the beam splitter comprises an unbalanced coupler, and the combiner comprises a 2×2 3 dB coupler, and wherein an attenuator and a phase adjusting unit are provided between the circulator and the mirror.

12. A pulse interleaver as claimed in claim 1, wherein output pulses derived from an individual pulse of the input pulse train are adjacent each other.

13. A pulse interleaver as claimed in claim 1, wherein the path lengths are selected such that output pulses derived from an individual pulse of the input pulse train are spaced a predetermined number of pulses apart in the output pulse train, such that a signal sequence at the input is interleaved with itself with an interleaving depth dependent on the predetermined number.

14. A pulse interleaver as claimed in claim 1, wherein the or each mirror and device for manipulating the state of polarization comprises a Faraday rotator mirror.

15. A pulse interleaver as claimed in claim 1, wherein the or each device for manipulating the state of polarization comprises a 45 degree aligned quarter wave plate.

16. An optical clock generation circuit comprising a clock generating block for generating an optical clock signal of first frequency, and at least one pulse interleaver as claimed in claim 1 having as input the optical clock signal of first frequency and providing as output an optical clock signal of second frequency which is an integer multiple of the first frequency.

* * * * *